United States Patent
Dick et al.

(10) Patent No.: US 6,983,614 B2
(45) Date of Patent: Jan. 10, 2006

(54) HEAT TRANSFER FLUID FOR SECONDARY REFRIGERATION SYSTEMS COMPRISING A FORMATE SALT AND SULFAMIC ACID

(75) Inventors: Diane L. Dick, Shaker Heights, OH (US); Thomas E. Rajewski, Auburn, MI (US); Gilbert R. Malone, Perry, OH (US)

(73) Assignee: The Lubrizol Corporation, Wickliffe, OH (US)

(*) Notice: Subject to any disclaimer, the term of this patent is extended or adjusted under 35 U.S.C. 154(b) by 0 days.

(21) Appl. No.: 10/257,608

(22) PCT Filed: Apr. 17, 2001

(86) PCT No.: PCT/US01/12423

§ 371 (c)(1),
(2), (4) Date: Jan. 21, 2003

(87) PCT Pub. No.: WO01/81497

PCT Pub. Date: Nov. 1, 2001

(65) Prior Publication Data

US 2004/0040336 A1    Mar. 4, 2004

Related U.S. Application Data

(60) Provisional application No. 60/197,646, filed on Apr. 17, 2000.

(51) Int. Cl.
*C09K 5/04*    (2006.01)
*C09K 5/00*    (2006.01)

(52) U.S. Cl. .......................................... 62/114; 252/71

(58) Field of Classification Search ................... 62/114, 62/467, 513, 434; 252/67, 70, 71, 73, 74, 252/75, 76, 77

See application file for complete search history.

(56) References Cited

U.S. PATENT DOCUMENTS

| | | | | | |
|---|---|---|---|---|---|
| 3,721,258 | A | * | 3/1973 | Dermiah et al. | ............ 137/111 |
| 4,642,194 | A | * | 2/1987 | Johnson | ...................... 210/699 |
| 4,699,726 | A | * | 10/1987 | Nolin et al. | ................... 252/75 |
| 4,759,852 | A | * | 7/1988 | Trulear | ........................ 210/699 |
| 5,784,887 | A | * | 7/1998 | Chow et al. | .................. 60/657 |
| 6,148,634 | A | * | 11/2000 | Sherwood | ..................... 62/434 |
| 6,723,254 | B1 | * | 4/2004 | Starzmann | ..................... 252/71 |

* cited by examiner

*Primary Examiner*—Cheryl J. Tyler
*Assistant Examiner*—Richard L. Leung
(74) *Attorney, Agent, or Firm*—Samuel B. Laferty; Teresan W. Gilbert

(57) ABSTRACT

A formate salt based heat transfer fluid containing sulfamic acid for a secondary refrigeration loop is disclosed. The formate based heat transfer fluid generally is a more effective heat transfer medium than a glycol based fluid designed to operate in the same temperature range. The formate based fluid also has lower toxicity and environmental risks than the glycol fluid.

29 Claims, 1 Drawing Sheet

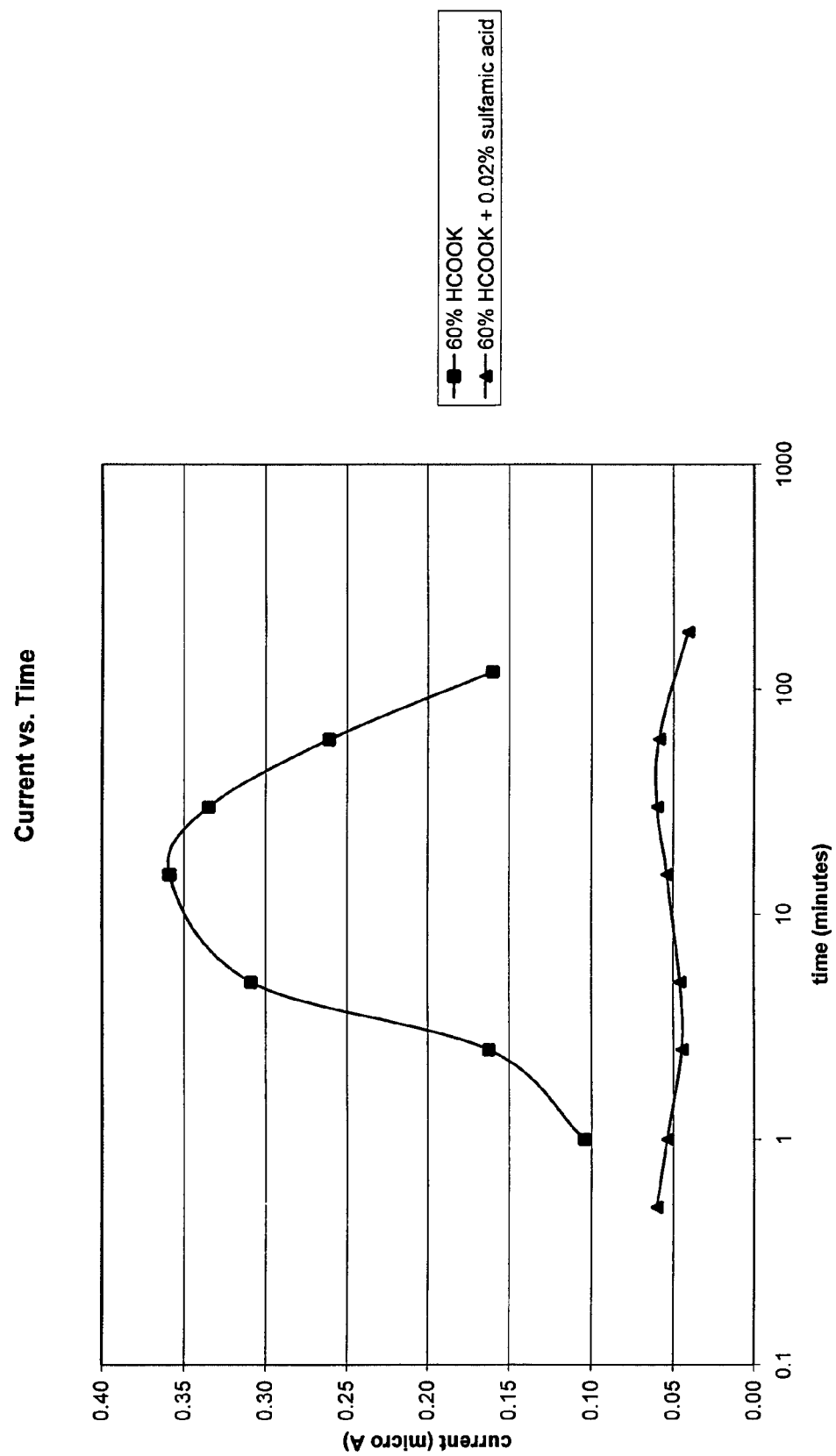

HEAT TRANSFER FLUID FOR SECONDARY REFRIGERATION SYSTEMS COMPRISING A FORMATE SALT AND SULFAMIC ACID

This application claims the benefit of Provisional Application No. 60/197,646, filed Mar. 17, 2000.

FIELD OF INVENTION

Secondary refrigeration fluids are used to transfer heat from a heat source to a source of cooling, typically a refrigeration unit. Secondary refrigeration fluids are members of the broader class of heat transfer fluids. The heat transfer fluids used in refrigeration have to remain fluid at low temperatures such as below 0° C. and preferably below −40° C. The heat transfer fluid disclosed herein includes a formate salt of sodium or potassium which acts as an electrolyte to reduce the freezing point of the water used in the solution.

BACKGROUND OF INVENTION

Ethylene glycol and propylene glycol water solutions are popular heat transfer fluids due to the low corrosivity of the glycols and the low fire hazard associated with them. A problem with these solutions is their potential toxicity both to the environment and to food products or animals and the decrease in thermal conductivity of water solutions as the glycol concentration increases. Heat transfer solutions are often used in secondary refrigeration loops to transfer heat from a heat source to a source of cooling such as a compression refrigeration unit. A plethora of advantages can be had from using a secondary refrigeration loop rather than transporting the primary refrigerant to remote heat exchangers, which are in contact with a heat source.

A de-icer composition was disclosed in GBB1111936. The composition included urea, and an alkali metal or ammonium salt of a saturated carboxylic acid which contains up to 6 carbon atoms. U.S. Pat. No. 5,104,562 disclosed a coolant composition that comprised from about 3 to 9 parts by weight water, from about 1 to 2 parts by weight potassium formate, from about 1 to 9 parts by weigh of potassium acetate, from about 0 to 1.5 parts by weight urea, and from about 0 to 1.5 parts by weight of a glycol. U.S. Pat. No. 6,059,966 discloses a low-viscosity, aqueous coolant brine based on inhibited alkali metal acetates and/or formates having improved corrosion protection, wherein the coolant brines contain 0.2 to 5% by weight of alkali metal sulfites or pyrosulfites. WO9309198 disclosed a vapor absorbent composition comprising potassium formate for an absorbent refrigeration, air conditioning, heat pumping or dehumidifying system. WO9639472 disclosed a method for performing heat exchange transfer with a heat transfer medium and a heat exchange apparatus. The pumpable heat transfer medium for performing heat transfer with a target (b) was characterized in that it contains potassium formate dissolved in water. Canadian patent application 2,220,315 disclosed a composition comprising: (1) at least one potassium salt of a $C_{1-9}$ carboxylic acid; and (2) a corrosion inhibitor package comprising: (a) sodium or potassium nitrite; (b) sodium borate pentahydrate; and (c) tolytriazole. EP 677 563 to Linde discloses a method of operating a refrigerating plant using an aqueous potassium formate solution as the refrigerant.

It would be desirable to identify a heat transfer fluid with lower toxicity than glycol solutions and desirably having better heat transfer properties and minimal tendency toward metal corrosion.

SUMMARY OF INVENTION

A heat transfer medium comprising a formate salt in water containing selected, compatible corrosion inhibitors and/or biocides is disclosed. A preferred use is in secondary refrigeration loops to transfer heat from a heat source to a source of cooling such as a compression refrigeration unit or absorption refrigeration unit. The formate is the primary electrolyte used to reduce the freezing temperature of the solution. The pH of the heat transfer medium is desirably adjusted above 8. Other electrolytes or conventional freezing point depressors such as glycols or alcohols can be present but are not required. Selected corrosion inhibitors and biocides are desirably present for applications where the system includes metals and the solution will be recycled and reused. Desirably the corrosion inhibitors and biocides are water soluble compounds.

The heat transfer medium is particularly desirable in applications where the primary refrigerant (defined as the working fluid which transfers heat from or to the system) is desirably excluded from environments where its presence or the presence of a relatively toxic secondary refrigeration fluid would present health or safety concerns.

BRIEF DESCRIPTION OF DRAWINGS

The attached figure illustrates the effect of 0.02 weight percent of the potassium salt of sulfamic acid on the galvanic current generated between dissimilar metals immersed in a potassium formate solution.

DETAILED DESCRIPTION OF THE INVENTION

The formate salt can be potassium or optionally sodium, optionally including trace contaminants such as other salts from the water source. These contaminants would typically be contaminants found in tap or drinking water supplies such as calcium, magnesium, carbonate, chloride, fluoride, and iron ions, etc. The ability to prepare the heat transfer fluid with conventional tap water and/or industrial make up water is a particular advantage. Various additives can be added to the heat transfer fluid to help it accommodate impurities. These might be additional biocides, scavengers for chlorine, and complexing agents such as ethylenediaminetetraacetic acid or its salt.

Desirably the solution is from about 2 to about 77 weight percent of a formate salt of potassium and/or sodium. More desirably the formate salt is from about 5 to about 75 weight percent and preferably from about 10 to about 60 weight percent of the heat transfer fluid. Desirably the formate salt is at least 50 mole percent of the total salts in the solution and more desirably at least 75 or 80 mole percent. The formate solution can contain other materials like acetate salts of sodium or potassium or alkylene glycols (ethylene glycol or propylene glycol). While glycols can be present at various concentrations, depending on the particular application, preferred concentrations for use with the formate salt are either substantially no glycol at all or concentrations from about 0.1 to about 5 or 10 weight percent based upon the weight of the fluid. These components may be present in any concentration in the heat transfer fluid. While it is later taught that the formate solutions have better heat transfer properties than the glycol solutions and improved properties over an acetate salt solution, the system is tolerant to these components and they may be added for specific purposes.

The formate offers many advantages over the glycol type solutions. It has better heat transfer and it has much lower toxicity than glycol in cases of food contamination or with respect to the environmental concerns with spills etc. The pH of the formate solution is desirably adjusted above 8, more desirably from about 8 to 12 and most desirably from 8.5 or 9 to 11 and preferably from 9.5 to 10 to minimize corrosion. The fluid can be buffered with various buffers to control the pH variation should the heat transfer solution be further diluted or contaminated with an acid or base.

The concentration of the formate salt in the heat transfer fluid only needs to be high enough to prevent freezing of the heat transfer fluid. This is usually accomplished by determining the coldest temperature to which the heat transfer fluid will be exposed and then forming a heat transfer fluid that will remain unfrozen at a temperature at least 5° C. colder than the anticipated temperature.

Water is a preferred heat transfer fluid over many organic compounds due to its low viscosity and non-toxic nature. However, water freezes at about 0° C. and the formate salt is necessary to allow the use of the water without freezing (to keep the water as a pumpable liquid under conditions below 0° C. when used as a coolant for low temperature applications).

Desirably the water is present in the formate solutions at concentrations of at least 20 weight percent based on the weight of the heat transfer fluid and more desirably from about 23 or 25 to about 95 or 98 weight percent of the heat transfer fluid and preferably from about 50 to about 90 weight percent. In many glycol based heat transfer fluids a purified or distilled water is recommended to obtain good heat transfer activity and longer fluid life. With said invention tap water may be used to make up the heat transfer fluid and tap water may be used to dilute the heat transfer fluid.

Selected corrosion inhibitors which exhibit good solubility in high salt aqueous solutions are used in the formate salt based heat transfer fluids. These corrosion inhibitors may be present in concentrations up to 4 weight percent and desirably above 0.01 weight percent or from about 0.1 weight percent up to 2 weight percent based on the weight of the heat transfer fluid. Corrosion inhibitors include triazole inhibitors such as benzotriazole (preferred in combination), benzimidazole, a diazole such as dimercaptothiadiazole (preferred in combination); water-soluble aryl sulfonates, citric acid, sulfamic acid (preferred), inorganic nitrites, and mixtures of $C_5$ to $C_8$ monocarboxylic acid or alkali-, ammonium- or amino-salts of said acid, a $C_2$-$C_8$ dicarboxylic acid or alkali-, ammonium- or amino-salts of said acid. Vapor phase corrosion inhibitors can also be added to the fluid and would reduce corrosion on surfaces that are not always in contact with the fluid. A preferred vapor phase corrosion inhibitor would be tertiary amine, $R_3N$, where R contains 1 to 4 carbon atoms. Vapor phase corrosion inhibitors are generally desirable at concentrations up to 0.3 weight percent based on the weight of the fluid.

Biocides are also desirable components in the heat transfer fluid. The biocides prevent the growth of various plant and animal life that may be introduced from the water supply or which have been growing in the prior heat transfer fluid. Desirably the biocide is present at a concentration of less than 0.5 weight percent and more desirably less than 0.3 weight percent. Preferred biocides are various copper salts that can effectively control most plant and animal growth at less than 0.025 weight percent concentrations and more desirably less than 0.005 weight percent based on the weight of the heat transfer fluid. The copper cation seems to be primarily associated with the biocide activity. With these copper salts the actual copper concentration is less than 100 ppm and more desirably less than 25 ppm. Suitable copper salts include copper acetate, copper sulfate, and copper citrate. The copper salts may also improve the thermal conductivity of the heat transfer solution and assist in preventing certain types of corrosion. Glutaraldehyde can also be added to the fluid as a biocide.

Desirably both the corrosion inhibitors and the biocide are soluble at levels higher than that necessary for many applications so that the entire heat transfer fluid can be prepared as a concentrate. This provides an opportunity to deliver the effective concentrations of corrosion inhibitor and/or biocide upon dilution with water at the site of use to form a heat transfer fluid.

One can also include metal ion scavengers (chelating agents) such as ethylenediaminetetraacetic acid or its salt (EDTA). Desirable concentrations of chelating agents are up to 2 or 6 weight percent and more desirably from about 0.2 to about 6 weight percent based on the weight of the fluid (heat transfer composition.

The heat transfer fluid using formate salt is useful as the transfer medium to transfer heat from a target (the object to be cooled) to a heat sink or vice versa to transfer heat to a target (the object to be heated) from a heat source to effect cooling or heating, respectively of the target. The use of both cooling and heating occurs in geothermal heating and/or cooling where the heat sink is typically the earth's crust at a depth of 2 to 6 feet and heat or cooling is transferred from this heat sink to the compression refrigeration system. Thereafter the compression refrigeration system transfers the heat or cooling to the building or other target to be heated or cooled. The cooling/heating source can be a compression refrigeration system an absorption refrigeration system, a heat pump, or any other source of cooling or heating (e.g. a heat sink comprising a refrigerated fluid). Secondary loop heat transfer fluids are used in a variety of systems where the primary refrigerant is to be physically isolated from the final application of heating or cooling. The secondary loop systems will be defined as where a heat transfer medium is used to transport heat energy from a target to a primary refrigeration system or transfer heat energy from a heat source to a target (e.g. geothermal heating). The primary refrigeration system is where heat is transferred to the external environment (heat sink) by way of a primary refrigerant or vice versa. The primary refrigerant may use a compressor refrigeration system or an absorbent refrigeration system.

The purpose of isolating the primary coolant from the heat sink or target can vary but may include hazards associated with the primary refrigerant (e.g. toxicity, flammability), cost of the primary refrigerant, difficulty transporting the primary refrigerant (e.g. possibly factors such as the need for higher cost transport lines, higher cost heat transfer equipment (heat exchangers), viscosity problems, concerns about pressure, concerns about returning all the components of the primary refrigerant back to the compressor), ability to store cheaper fluids and their thermal energy during low energy cost periods etc. Systems that include a secondary loop offer advantages in that they can be very compact in design, can be factory built and charged with the primary refrigerant, are capable of operating with an extremely small charge of refrigerant, and can be located at a central or remote location e.g. a roof top, a ventilated room or somewhere away from humans where vibrations or noise of operation might be a concern. Incorporated herein by reference are U.S. Pat. Nos. 5,819,549; 5,104,562; WO 99/37733; and WO 96/39472 including their disclosures about coolants, transfer efficiency measurements, and problems with the prior art heat transfer fluids.

In compression refrigeration, the refrigerant is desirably an organic or halogenated organic refrigerant or an inorganic refrigerant (e.g. $CO_2$, butane, fluorocarbon or ammonia). The heat transfer fluid is particularly desirable with fluorocarbon based refrigerant systems because the secondary heat transfer fluid is pumped at much lower pressures than the fluorocarbon and minimizes the risk of fluorocarbon system leaks by minimizing the portion of the system occupied by the fluorocarbon (fluorocarbon doesn't have to be present in portion of system occupied by the secondary heat transfer fluid). In ammonia based compression refrigeration systems the formate salt heat transfer fluid helps minimize the total volume of ammonia needed without reducing capacity of the system. This allows the use of ammonia in geographical areas where larger volumes of ammonia would constitute a significant hazard to human safety or life if a leak occurred. Other refrigerant fluids include alkanes of 1–10 carbon atoms with butane and propane being preferred or things like carbon dioxide. The formate salt heat transfer fluid can also be used in closed environments (buildings with minimal ventilation) where an ammonia heat transfer fluid would be hazardous. Typically secondary loop fluids need to be able to be cooled to at least −15° C. or −25° C. and possibly down to −30° C. or −40° C. without becoming a solid or so viscous that pumping becomes difficult.

In a preferred embodiment, a method for providing cooling and/or heating comprises a) passing a primary refrigerant through a refrigeration cycle to transfer heat from the evaporator side to the condenser side, b) contacting a heat transfer fluid with said evaporator side or said condenser side of said refrigeration cycle and thereby cooling or heating said heat transfer fluid, c) pumping said heat transfer fluid from said evaporator or condenser side to another location and transferring heat from between said location and said heat transfer fluid, and d) pumping said heat transfer fluid from step (c) back to said evaporator side of said refrigeration cycle, wherein the improvement comprises using sodium and/or potassium formate salt at concentrations from about 2 to about 77 weight percent in a water at a pH above 8 with at least 0.01 weight percent sulfamic acid present in a solution as major component in said heat transfer fluid.

The heat transfer fluid can be used for heating or cooling applications, i.e., in application where the refrigerant is being used to pump heat from a heat sink (heating) or to pump heat into a heat sink (cooling). The article to be heated can be a climate control for humans or other animals or it can be an application where a chemical composition is being heated or other commercial application where heat is being applied. Alternatively, on the cooling side, cooling can be used for climate control, including dehumidifying, or to refrigerate or freeze a chemical composition, foodstuff, or in a commercial or residential application requiring cooling such as an ice rink. Cooling is also an important part of food processing where foodstuffs are prepared and then quickly cooled or frozen to preserve their nutrients and avoid decomposition or contamination by bacterial or fungal growth. While a preferred embodiment involves use of the heat transfer fluid with a compression or absorptive refrigeration equipment, the heat transfer fluid can be used in other applications where temperature control is achieved by pumping a fluid through composition of matter e.g., as using a fluid to control temperature in an internal combustion engine or using a fluid to control the temperature in a reactor or under material molding conditions.

EXAMPLES

Various combinations of at least potassium formate, optionally including potassium acetate and/or potassium nitrate were prepared in water and tested for heat transfer capacity, freezing points, corrosivity, and viscosity at reduced temperatures. The effect of various concentrations of the above components on the thermal conductivity, corrosion tendencies, freezing points, pH, and Brookfield viscosity at −40° C. were observed and recorded. The solutions compared favorably with propylene glycol solutions in terms of thermal conductivity. The solutions could be prepared with low corrosion tendencies towards copper and other metals. The solutions maintained low viscosities down to −40° C.

Samples of a heat transfer fluid comprising a first example of 60wt.% potassium formate in water without any corrosion inhibitor and a second sample of 60% wt.% potassium formate with 0.02 wt.% sulfamic acid were compared in a galvanic current versus time plot. The plot is shown as an attached figure.

The galvanic corrosion test was conducted according to Guidelines for Conducting and Evaluating Galvanic Corrosion Tests in Electrolytes ASTM G71 using various metal coupons from Metaspec Co., P.O. Box 27707, San Antonio, Tex. 78227-0707. One lead was connected to a copper specimen while the other lead was connected to an aluminum specimen. The aluminum specimen was 304-C aluminum alloy (QQ-A-250/4 2024 T-3 bare ½"×3"×1/16", with a ¼" hole, ¼" from the end) and was polished to 280. The copper specimen was a 304-A copper alloy (CA-110, QQ-C-576, annealed ETP, ½"×3"×1/16", with a ¼" hole, ¼" from the end) and polished to 280. All specimen were washed with heptane then isopropanol and dried to remove any commercial corrosion inhibitor that may have been applied by the manufacturer. The sample of electrolyte was a volume of 258 mL and an air flow of 1 mL/min was added. The solution was stirred. Both samples were 60 wt. % potassium formate. Any dilution of the potassium formate to reach 60% was done with double distilled water. The pH of both solutions was adjusted to 9.96 with KOH before the test. The sulfamic acid (0.02% by wt.) was to the second sample before the pH adjustment. The two electrodes were spaced 7 mm apart. The test temperature was 25° C. The test measures the tendency of a solution to develop an electrical potential or current when two dissimilar metals exist in contact with the electrolyte solution.

Table 1 shows the effect of the potassium salt of sulfamic acid on weight change due to corrosion of immersed metal coupons during a two week storage test at 25° C. The metal coupons are the same as used in the galvanic corrosion test.

TABLE 1

Effect of Salt of Sulfamic Acid on Corrosion

| Metal | Coupon wt. g | 60 wt. % HCOOK | 60 wt. % HCOOK with 0.1% |
|---|---|---|---|
| Cu | 12.9 | −0.0065 g | −0.0009 g |
| Steel | 11.6 | −0.1795 g | −0.0003 g |
| Al | 4.1 | −0.0028 g | 0.0002 g |

ASTM D1384 was used to measure the weight loss of metal coupons after being exposed to potassium formate solution with sodium benzotriazole or sulfamic acid corrosion inhibitor. The potassium formate solution was 60 wt. % concentration. The pH was adjusted to 9.5–10.0 with KOH. The sulfamic acid was added to the second sample before the pH adjustment. All of the coupons were put in the same bath. The coupons were similar in composition and polish to the samples for the galvanic corrosion test. They were assembled together as a package. They were not connected to any electrical grounding equipment (i.e. they were electrically isolated except for the electrolyte). The surface area of each coupon was about 1300 mm$^2$ and the weight of each coupon ranged from 9 g for cast Al to 25 g for cast iron. Each coupon was weighed prior to the test and after immersion in the solution for two weeks (336 hrs). at the beginning. The values represent the change in the sample weight after 336 hours. A negative value indicates that the coupon lost weight during the test. The temperature of the solution was 88° C. The coupons or samples were fully immersed.

TABLE 2

Comparison of Benzotriazole and Sulfamic Acid Salt as Corrosion Inhibitors.

| Metal | 60 wt. % HCOOK with 0.2% benzotriazole | 60 wt. % HCOOK with 0.5% sulfamic acid * | 60 wt. % HCOOK with 0.02% sulfamic acid * |
|---|---|---|---|
| Cu | 0.0046 g | 0.0118 g | 0.0004 g |
| Solder | −0.261 g | −0.3561 g | 0.0953 g |
| Brass | 0.0048 g | 0.0078 g | −0.0007 g |
| Steel | 0.0454 g | −0.0493 g | −0.0951 g |
| Cast Fe | 0.0387 g | −0.0133 g | −0.0347 g |
| Cast Al | 0.0048 g | 0.0415 g | −0.0152 g |

* These samples also had 0.002 wt. % of copper citrate biocide therein.

Solutions of potassium formate were prepared to determine the general physical properties that could be expected of the solutions. The solutions were prepared by diluting with distilled water a concentrated 72 wt. % solution of potassium formate.

TABLE 3

Various Concentrations of Potassium Formate

| Concentration | Viscosity centistokes −10/−20/−30° C. | pH | Specific Gravity | Freezing point ° C. |
|---|---|---|---|---|
| 72% | 19.6/35.1/74.3 | 9.88 | 1.5256 | −54 |
| 52% | 4.94/7.4/11.9 | 9.24 | 1.3665 | < 54 |
| 35% | 2.95/4.2/– | 8.65 | 1.2279 | −36 |

What is claimed is:

1. A heat transfer composition comprising water, potassium formate, from about 0.01 to about 4 weight percent of sulfamic acid based on the weight of said heat transfer composition, and optionally water soluble biocides at a pH above 8.

2. A heat transfer composition according to claim 1, further including a metal chelating agent.

3. A heat transfer composition according to claim 2, wherein said metal chelating agent is ethylenediaminetetraacetic acid or a salt of said acid, and said metal chelating agent is present at a concentration of up to 2 weight percent based on the weight of said heat transfer composition.

4. A heat transfer composition according to claim 1, further including an alkylene glycol in an amount from about 0.1 to about 5 or 10 weight percent based on the weight of said heat transfer composition.

5. A heat transfer composition according to claim 4, wherein said alkylene glycol is ethylene glycol, propylene glycol, or combinations thereof.

6. A heat transfer composition according to claim 1, further including glutaraldehyde.

7. A heat transfer composition according to claim 1, further including up to 0.3 weight percent of a tertiary amine effective as a vapor phase corrosion inhibitor, said weight percent being based upon the weight of said heat transfer composition.

8. In a refrigeration, heat pump, freezing, or climate control system including
   a) a primary refrigerant contained in a compression or absorption refrigeration equipment to pump heat between a target and heat sink (towards or from) and
   b) a heat transfer fluid to transport heat away from or towards said refrigeration equipment, the improvement comprising including from about 2 to about 77 weight percent of a potassium and/or sodium salt of formic acid adjusted to a pH above 8 and from about 0.01 to about 4 weight percent sulfamic acid in said heat transfer fluid along with at least 20 weight percent water based on the weight of said heat transfer fluid.

9. A system according to claim 1, wherein said salt of formic acid is from about 5 to about 75 weight percent of said heat transfer fluid.

10. A system according to claim 1, wherein said salt of formic acid is from about 10 to about 60 weight percent of said heat transfer fluid.

11. A system according to claim 1, wherein said heat transfer fluid further includes a biocide.

12. A system according to claim 11, wherein said heat transfer fluid includes a copper salt.

13. A system according to claim 11, wherein said biocide is present at a concentration less than 0.3 weight percent.

14. A system according to claim 1, wherein said heat transfer fluid further includes at least one of a salt of acetic acid, an alkylene glycol, and contaminants from a tap water source.

15. A system according to claim 14, wherein said heat transfer fluid includes less than 0.025 weight percent of a copper salt of an organic mono or polycarboxylic acid and the concentration of copper is less than 100 parts per million by weight (ppm).

16. A system according to claim 14, wherein said system includes food processing equipment or food products as the target (heat source).

17. A system according to claim 1, wherein said systems includes a) chemical or other industrial processing equipment; b) an ice rink or ice-making equipment; c) refrigerated and/or frozen food storage equipment, or d) climate control equipment or other air handling equipment as said target.

18. A system according to claim 1, wherein said system is a geothermal heating and/or cooling system.

19. A system according to claim 1, further including up to 4 weight percent of a supplemental corrosion inhibitor to said sulfamic acid.

20. A system according to claim 1, wherein the pH of said heat transfer fluid is from about 8 to about 12.

21. A system according to claim 1, wherein said system employs a compression refrigeration equipment and said refrigerant is an organic or halogenated organic refrigerant.

22. A system according to claim 1, wherein said system employs compression refrigeration equipment and said primary refrigerant is ammonia or another inorganic material.

23. In a method for providing cooling and/or heating comprising;
 a) passing a primary refrigerant through a refrigeration cycle to transfer heat from the evaporator side to the condenser side,
 b) contacting a heat transfer fluid with said evaporator side or said condenser side of said refrigeration cycle and thereby cooling or heating said heat transfer fluid,
 c) pumping said heat transfer fluid from said evaporator or condenser side to another location and transferring heat from between said location and said heat transfer fluid, and
 d) pumping said heat transfer fluid from step c back to said evaporator side of said refrigeration cycle,
 wherein the improvement comprises using sodium and/or potassium formate salt at concentrations from about 2 to about 77 weight percent in a water at a pH above 8 with from about 0.01 to about 4 weight percent sulfamic acid present in a solution as major component in said heat transfer fluid.

24. A method according to claim 23, wherein said formate salt is used at concentrations from about 10 to about 50 weight percent in water.

25. A method according to claim 23, wherein said heat transfer fluid further comprises less than 0.025 weight percent of a copper salt of an organic mono or polycarboxylic acid and the concentration of copper in said heat transfer fluid is less than 100 parts per million by weight (ppm).

26. A method according to claim 25, wherein said heat transfer fluid is used to cool a food product at said another location.

27. A method according to claim 23, wherein said heat transfer fluid is used to cool a) an industrial chemical in chemical processing equipment; b) a liquid to form an ice rink or ice; c) refrigerated and/or frozen food storage equipment; or d) climate control at said another location.

28. A method according to claim 23, wherein said refrigeration cycle is a compression refrigeration cycle using an organic or halogenated organic refrigerant.

29. A method according to claim 23, wherein said refrigeration cycle is a compression refrigeration cycle using ammonia or another inorganic refrigerant.

* * * * *